(12) United States Patent
Roh et al.

(10) Patent No.: US 10,393,585 B2
(45) Date of Patent: Aug. 27, 2019

(54) SPECTRAL DETECTOR AND SPECTRAL DETECTING METHOD USING THE SAME

(71) Applicant: SAMSUNG ELECTRONICS CO., LTD., Suwon-si (KR)

(72) Inventors: Sookyoung Roh, Seoul (KR); Sunghyun Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/799,220

(22) Filed: Oct. 31, 2017

(65) Prior Publication Data
US 2018/0052048 A1   Feb. 22, 2018

(30) Foreign Application Priority Data
Nov. 1, 2016   (KR) .................. 10-2016-0144481

(51) Int. Cl.
| | |
|---|---|
| *G01J 3/42* | (2006.01) |
| *G01J 3/18* | (2006.01) |
| *G01J 3/28* | (2006.01) |
| *G01J 3/02* | (2006.01) |

(52) U.S. Cl.
CPC .............. *G01J 3/18* (2013.01); *G01J 3/0237* (2013.01); *G01J 3/0256* (2013.01); *G01J 3/0278* (2013.01); *G01J 3/1804* (2013.01); *G01J 3/28* (2013.01); *G01J 3/2803* (2013.01); *G01J 2003/2813* (2013.01)

(58) Field of Classification Search
CPC .... G01J 3/02; G01J 3/18; G01J 3/2803; G01J 3/2823; G01J 3/28
USPC .......................................................... 356/328
See application file for complete search history.

(56) References Cited

U.S. PATENT DOCUMENTS

| | | |
|---|---|---|
| 4,729,658 A | 3/1988 | Poultney |
| 8,809,758 B2 | 8/2014 | Molnar et al. |
| 8,946,619 B2 | 2/2015 | Wu et al. |
| 9,046,466 B2 | 6/2015 | Ouchi |
| 9,086,536 B2 | 7/2015 | Pang et al. |
| 2002/0126279 A1* | 9/2002 | Kung .................. G01J 3/02 356/328 |
| 2011/0242461 A1* | 10/2011 | Escuti ............ G02F 1/133504 349/96 |
| 2012/0091372 A1 | 4/2012 | Molnar et al. |
| 2015/0145084 A1 | 5/2015 | Chang |

(Continued)

OTHER PUBLICATIONS

Communication dated Apr. 6, 2018, issued by the European Patent Office in counterpart European Application No. 17199246.4.

(Continued)

*Primary Examiner* — Md M Rahman
(74) *Attorney, Agent, or Firm* — Sughrue Mion, PLLC

(57) ABSTRACT

A spectral detector includes a grating panel including a first grating pattern having a first period, a second grating pattern having a second period that is different from the first period, and a light exit surface through light exits the grating panel, and an optical measurement panel arranged to face the light exit surface of the grating panel, and configured to measure a change in intensity of first light passing through the first grating pattern according to a propagation distance of the first light, and to measure a change in intensity of second light passing through the second grating pattern according to a propagation distance of the second light.

21 Claims, 13 Drawing Sheets

(56) References Cited

U.S. PATENT DOCUMENTS

2016/0124223 A1\* 5/2016 Shinbo ............... G02B 27/0101
　　　　　　　　　　　　　　　　　　　　　　　　　385/37
2017/0168209 A1\* 6/2017 Shin ....................... G02B 6/005

OTHER PUBLICATIONS

Helen L. Kung et al. "Transform spectrometer based on measuring the periodicity of Talbot self-images" Optics Letters, vol. 26, No. 21, Nov. 1, 2001 (pp. 1645-1647) XP055456357.

\* cited by examiner

SPECTRAL DETECTOR AND SPECTRAL DETECTING METHOD USING THE SAME

CROSS-REFERENCE TO RELATED APPLICATION

This application claims priority from Korean Patent Application No. 10-2016-0144481, filed on Nov. 1, 2016, in the Korean Intellectual Property Office, the disclosure of which is incorporated herein in its entirety by reference.

BACKGROUND

1. Field

Exemplary embodiments disclosed herein relate to spectral detectors and spectral detecting methods using the same.

2. Description of the Related Art

In general, optical spectrum analysis is used to analyze physical and chemical states of an object to be measured. At present, optical spectrum analysis has been applied in various industrial fields, including optics, medical science, chemistry, ocean engineering, and many other fields.

Examples of spectroscopic techniques include a method of dispersing light by transmitting incident light through a crystal structure having a periodic structure so that the light may travel in different directions according to wavelengths thereof, and a filtering method for measuring only light of a specific wavelength by transmitting the light through an optical filter such as a Fabry-Perot interferometer.

In a diffraction grating method, a fine diffraction grating is manufactured and a spectrometer is configured using the principle that light diffracts according to a wavelength thereof. In the diffraction grating method, a certain propagation distance of light should be secured to obtain high resolution, and thus it is difficult to manufacture a spectral detector in a small size.

In the case of a filter array-based spectral detector, for increasing resolution, it is required to manufacture filters more precisely or increase the number of filters. In general, a limitation of the resolution of a filter array-based spectrometer is determined by the number of filters. However, the number of filters cannot be indefinitely increased in manufacturing a portable spectrometer of a small size.

SUMMARY

Exemplary embodiments disclosed herein may provide spectral detectors using a Talbot effect and spectral detecting methods using the same.

Additional aspects will be set forth in part in the description which follows and, in part, will be apparent from the description, or may be learned by practice of the presented exemplary embodiments.

According to an aspect of an exemplary embodiment, there is provided a spectral detector including: a grating panel including: a first grating pattern having a first period, a second grating pattern having a second period that is different from the first period; and a light exit surface through which light exits the grating panel; and an optical measurement panel arranged to face the light exit surface of the grating panel, and configured to measure a change in intensity of first light passing through the first grating pattern according to a propagation distance of the first light, and to measure a change in intensity of second light passing through the second grating pattern according to a propagation distance of the second light.

The first grating pattern and the second grating pattern may be parallel to each other.

A surface of the optical measurement panel which receives the light that exits the light exit surface is arranged obliquely with respect to the light exit surface of the grating panel.

The spectral detector may further include a distance adjustor configured to change a distance between the optical measurement panel and the grating panel to thereby change the propagation distance of the first light and the propagation distance of the second light.

The spectral detector may further include a processor configured to obtain at least one wavelength spectrum of light incident on the grating panel based on the change in intensity of the first light according to the propagation distance of the first light and the change in intensity of the second light according to the propagation distance of the second light.

The processor may be further configured to obtain a first wavelength spectrum based on the change in intensity of the first light according to the propagation distance of the first light, and a second wavelength spectrum based on the change in intensity of the second light according to the propagation distance of the second light.

The processor may be further configured to determine whether a difference between the first wavelength spectrum and the second wavelength spectrum is greater than or equal to a reference value.

The spectral detector may further include an angle adjustor configured to, when the difference between the first wavelength spectrum and the second wavelength spectrum is greater than or equal to the reference value, adjust an angle of a surface of the optical measurement panel which receives the light after the light exits the light exit surface.

The processor may be further configured to calculate the first wavelength spectrum and the second wavelength spectrum based on an algorithm, and to adjust the algorithm when the difference between the first wavelength spectrum and the second wavelength spectrum is greater than or equal to the reference value.

The processor may be further configured to obtain a wavelength spectrum of light incident on the grating panel by performing a Fourier transform on each of the change in intensity of the first light according to the propagation distance of the first light and the change in intensity of the second light according to the propagation distance of the second light.

The grating panel may further include at least one additional grating pattern having a period that is different from periods of the first and second grating patterns.

According to an aspect of another exemplary embodiment, there is provided a spectral detecting method including: emitting light to be incident on a grating panel comprising a first grating pattern having a first period, a second grating pattern having a second period different from the first period, and a light exit surface through which light is configured to exit the grating panel; and measuring a change in intensity of first light passing through the first grating pattern according to a propagation distance of the first light and a change in intensity of second light passing through the second grating pattern according to a propagation distance of the second light by using an optical measurement panel facing the light exit surface of the grating panel.

The first grating pattern and the second grating pattern may be parallel to each other.

The spectral detecting method may further include arranging a surface of the optical measurement panel, which receives the light that exits the light exit surface, obliquely with respect to the light exit surface of the grating panel.

The spectral detecting method may further include changing a distance between the optical measurement panel and the grating panel to thereby change the propagation distance of the first light and the propagation distance of the second light.

The spectral detecting method may further include obtaining at least one wavelength spectrum of light incident on the grating panel based on the change in intensity of the first light according to the propagation distance of the first light and the change in intensity of the second light according to the propagation distance of the second light.

The obtaining the at least one wavelength spectrum of the light incident on the grating panel may include: obtaining a first wavelength spectrum based on the change in intensity of the first light according to the propagation distance of the first light; and obtaining a second wavelength spectrum based on the change in intensity of the second light according to the propagation distance of the second light.

The spectral detecting method may further include determining whether a difference between the first wavelength spectrum and the second wavelength spectrum is greater than or equal to a reference value.

The spectral detecting method may further include changing an angle of a surface of the optical measurement panel when the difference between the first wavelength spectrum and the second wavelength spectrum is greater than or equal to the reference value.

The spectral detecting method may further include adjusting an algorithm used to calculate the first wavelength spectrum and the second wavelength spectrum when the difference between the first wavelength spectrum and the second wavelength spectrum is greater than or equal to the reference value.

The obtaining of the at least one wavelength spectrum of the light incident on the grating panel includes performing a Fourier transform on each of the change in intensity of the first light according to the propagation distance of the first light and the change in intensity of the second light according to the propagation distance of the second light.

According to an aspect of another exemplary embodiment, there is provided an optical detector, including: a grating panel configured to receive light, output a portion of the light to have a first wavelength spectrum, and output another portion of the light to have a second wavelength spectrum different from the first wavelength spectrum; an optical measurement panel configured to measure an intensity of the first wavelength spectrum and an intensity of the second wavelength spectrum; and a processor configured to determine whether an angle of the received light exceeds an estimated angle based on a comparison of the intensity of the first wavelength spectrum to the intensity of the second wavelength spectrum.

The grating panel may include a first grating pattern configured to output the first wavelength spectrum and a second grating pattern configured to output the second wavelength spectrum.

The processor may be configured to determine whether the angle of the received light exceeds the estimated angle based on a comparison of a wavelength corresponding to a peak intensity of the first wavelength spectrum to a wavelength corresponding to a peak intensity of the second wavelength spectrum.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
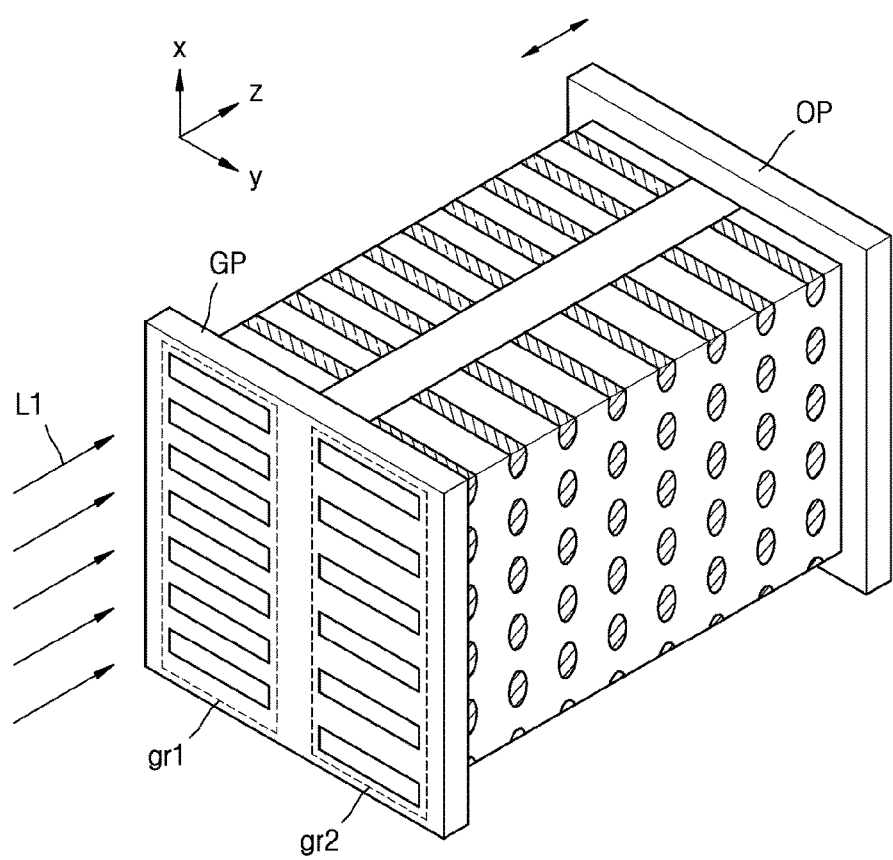
FIG. 1 is a perspective view illustrating a spectral detector according to an exemplary embodiment.

Hereinafter, spectral detectors and spectral detecting methods according to exemplary embodiments will be described with reference to the accompanying drawings.

In the present disclosure, general terms that have been widely used nowadays are selected, if possible, in consideration of functions of the exemplary embodiments set forth herein, but non-general terms may be selected according to the intentions of technicians in the art, precedents, or new technologies, etc. In addition, some terms may be arbitrarily chosen by the present applicant. In this case, the meanings of these terms will be explained in corresponding parts of the present disclosure in detail. Thus, the terms used to describe certain features of the exemplary embodiments herein should be defined not based on the names thereof but based on the meanings thereof and the overall context of the exemplary embodiments.

It will be understood that when an element or layer is referred to as being "connected to" another element or layer, the element or layer can be directly connected to another element or layer or can be electrically connected to another element or layer having intervening elements or layers therebetween. In contrast, when an element is referred to as being "directly on" another element or layer, there are no intervening elements or layers present. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the terms "unit", "module", etc., should be understood as units for processing at least one function or operation and may be embodied as hardware, software, or a combination thereof.

As used in the description of the exemplary embodiments, terms such as "include", "have", etc., should not be construed as including all components or operations described in the present disclosure. It should be understood that some of these components or operations may not be included or additional components or operations may be further included.

It will be understood that, although the terms "first", "second", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. As used herein, the term "and/or" includes any and all combinations of one or more of the associated listed items. Expressions such as "at least one of," when preceding a list of elements, modify the entire list of elements and do not modify the individual elements of the list.

It should be understood that the scope of the exemplary embodiments is not limited by the description of certain exemplary embodiments below and matters that can be easily derived by those of ordinary skill in the art fall within the scope of the exemplary embodiments. Exemplary embodiments will be described in detail with reference to the accompanying drawings below.

FIG. 1 is a perspective view illustrating a spectral detector according to an exemplary embodiment.

Referring to FIG. 1, a spectral detector according to an exemplary embodiment may include a grating panel GP and an optical measurement panel OP facing the grating panel GP. The grating panel GP may include a first grating pattern gr1 having a first period and a second grating pattern gr2 having a second period different from the first period. According to an exemplary embodiment, the term "grating pattern" should be understood to include a slit array, a slot array, an array of a plurality of grooves, and other types of gratings. The term "grating pattern" should also be understood to include various shaped patterns embossed on or engraved into a transparent material layer.

When incident light L1 passes through the grating panel GP, intensity of the incident light L1 may vary according to a direction in which the incident light L1 travels (e.g., a z-axis direction). For example, when parallel light (planar light) is incident on a grating pattern having a periodic structure, a grating image may repeatedly appear at distance intervals (e.g., intervals spaced apart by a certain distance). That is, interference patterns may be formed as brightness of light changes periodically according to the direction in which the incident light L1 travels (the z-axis direction). This phenomenon may be referred to as the Talbot effect.

In the Talbot effect, a distance interval SP at which interference patterns repeatedly occur may be expressed by Equation 1 below.

$$SP = \frac{\lambda}{1 - \sqrt{1 - \frac{\lambda^2}{P^2}}} \quad \text{[Equation 1]}$$

In Equation 1, P represents the period of the grating pattern gr1 or gr2, λ represents a wavelength of the incident light L1, and SP represents the distance interval at which the interference patterns repeatedly occur according to the Talbot effect.

As shown in Equation 1, a distance interval at which interference fringes repeatedly occur according to the Talbot effect depends on the wavelength of the incident light L1 and the periods of the grating patterns gr1 and gr2. Since the first grating pattern gr1 and the second grating pattern gr2 have different periods, interference patterns caused by first light passing through the first grating pattern gr1 and interference patterns caused by second light passing through the second grating pattern gr2 may repeatedly occur at different distance intervals. It is understood that the periods of the first grating pattern gr1 and the second grating pattern gr2 may have many different values, as would be appreciated by an artisan having ordinary skill in the art.

The spectral detector may include the optical measurement panel OP which faces a light exit surface of the grating panel GP and measures a change in intensity of the first light passing through the first grating pattern gr1 according to a propagation distance of the first light and a change in intensity of the second light passing through the second grating pattern gr2 according to a propagation distance of the second light.

Figure 2:
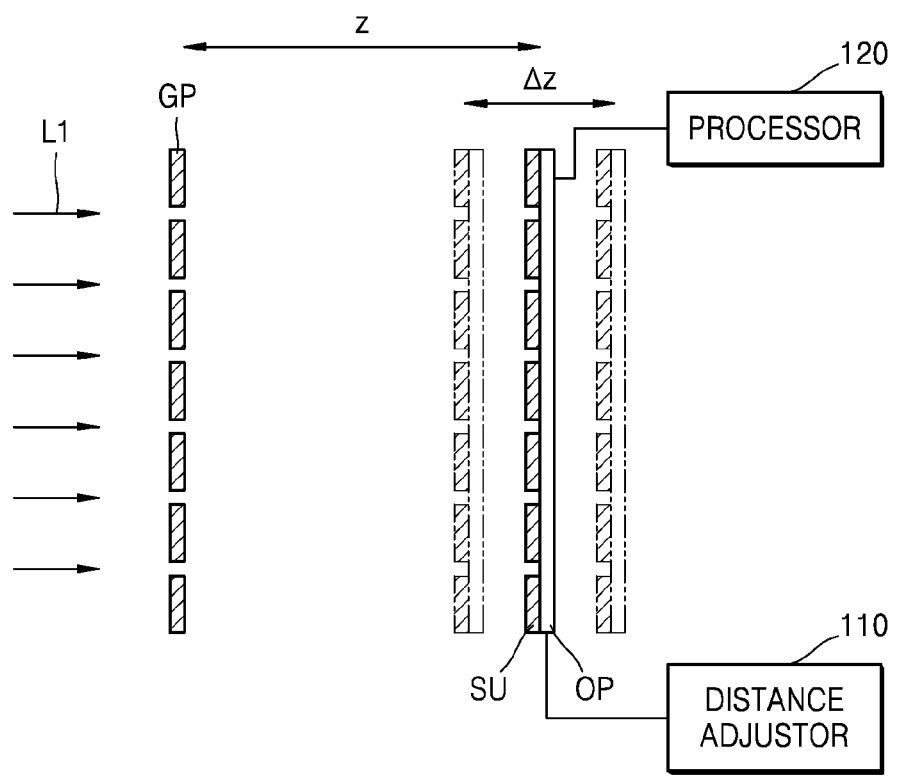
FIG. 2 is a cross-sectional view of the spectral detector of FIG. 1 along an z-x plane.

FIG. 2 is a cross-sectional view of the spectral detector of FIG. 1 along an z-x plane.

Referring to FIG. 2, the optical measurement panel OP may include a plurality of optical sensing units (e.g., light sensing units, also referred to as optical sensors or light sensors) SU which sense light incident on the optical measurement panel OP and generate an electrical signal. The plurality of optical sensing units SU may each include a photodiode, a charge-coupled device (CCD) sensor, or a complementary metal-oxide semiconductor (CMOS) sensor, but exemplary embodiments are not limited thereto.

The spectral detector may include a distance adjustor 110 which changes a location of the optical measurement panel OP. The distance adjustor 110 may change a distance between the optical measurement panel OP and the grating panel GP by moving the optical measurement panel OP in a z-axis direction. FIG. 2 illustrates a case in which the optical measurement panel OP is moved, but exemplary embodiments are not limited thereto. For example, the distance adjustor 110 may move the grating panel GP in the z-axis direction. As another example, the distance adjustor 110 may change locations of both of the grating panel GP and the optical measurement panel OP.

The optical measurement panel OP may generate an electrical signal by sensing light incident thereon. The electrical signal generated by the optical measurement panel OP may be transmitted to a processor 120. The processor 120 may analyze (or determine) an interference pattern of light passing through the grating panel GP by checking a change in intensity of an optical signal measured by the optical measurement panel OP, caused by a change in the distance between the optical measurement panel OP and the grating panel GP. The processor 120 may obtain information regarding an interference pattern formed by first light passing through the first grating pattern gr1 and information regarding an interference pattern formed by second light passing through the second grating pattern gr2. The processor 120 may obtain a wavelength spectrum of light L1 incident on the grating panel GP from a change in intensity of the first light according to a propagation distance of the first light and a change in intensity of the second light according to a propagation distance of the second light.

The processor 120 may determine a period of the interference pattern of the first light from the change in intensity of the first light according to the propagation distance of the first light. In this case, when the incident light L1 has different wavelengths, patterns repeatedly occurring in different periods may be mixed in the first light. Thus, the processor 120 may extract repetitive periodic components of the interference pattern by performing a Fourier transform on the change in intensity of the first light according to the propagation distance of the first light. Furthermore, the processor 120 may calculate a wavelength spectrum of the first light from the change in intensity of the first light according to the propagation distance of the first light. Similarly, the processor 120 may calculate a wavelength spectrum of the second light by performing Fourier transform on the change in intensity of the second light according to the propagation distance of the second light.

Figure 3:
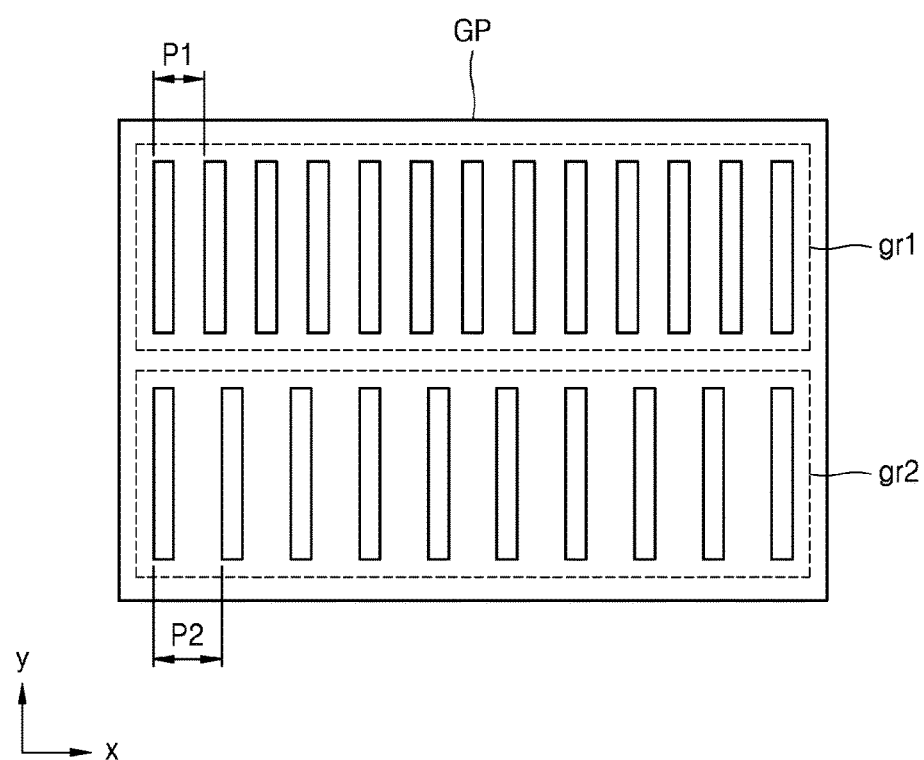
FIG. 3 is a diagram illustrating a surface of a grating panel of FIGS. 1 and 2.

FIG. 3 is a diagram illustrating a surface of the grating panel GP of FIGS. 1 and 2.

Referring to FIG. 3, the grating panel GP may include a first grating pattern gr1 and a second grating pattern gr2. A period P1 of the first grating pattern gr1 and a period P2 of the second grating pattern gr2 may be different from each other. The first grating pattern gr1 may be provided in an x-axis direction. Similarly, the second grating pattern gr2 may also be provided in the x-axis direction. Thus, the first grating pattern gr1 and the second grating pattern gr2 may be parallel to each other. The first grating pattern gr1 and the second grating pattern gr2 may be spaced apart from each other in a y-axis direction. Thus, the interference pattern according to the Talbot effect of FIG. 1 may vary according to a location of the y-axis direction. It is understood that the first grating pattern gr1 and the second grating pattern gr2 are not limited to being provided in the x-axis direction, and may instead be provided in other directions.

Although FIG. 3 illustrates examples of the first grating pattern gr1 and the second grating pattern gr2, exemplary embodiments are not limited to the configuration shown in FIG. 3.

Figure 4:
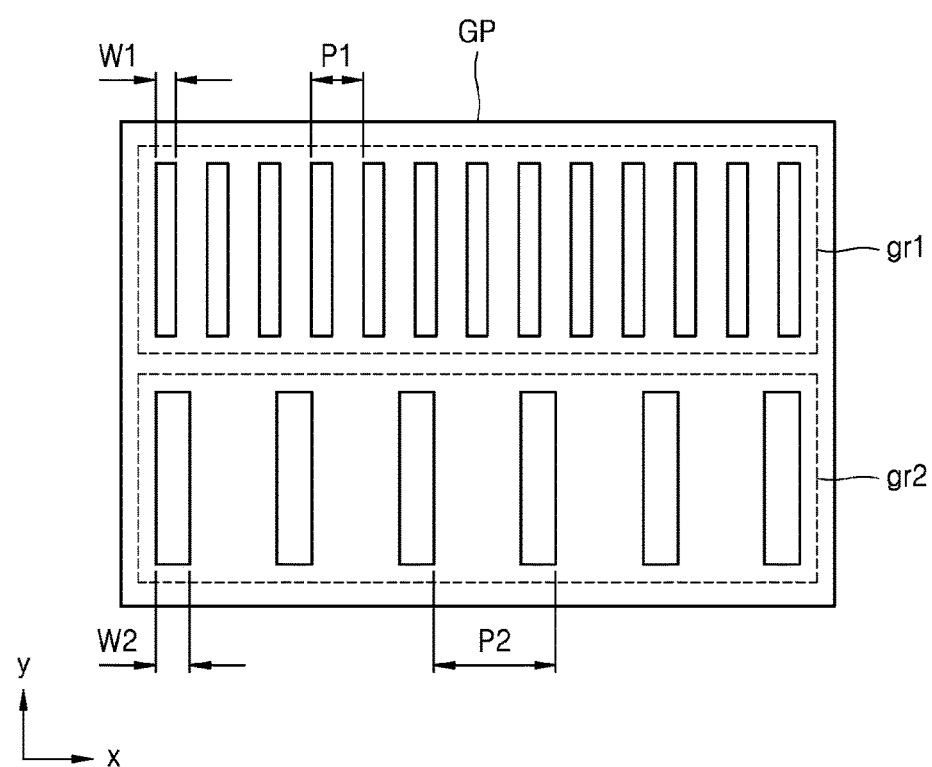
FIG. 4 is a diagram illustrating a surface of another example of a grating panel.

FIG. 4 is a diagram illustrating a surface of another example of the grating panel GP.

Referring to FIG. 4, the grating panel GP may include a first grating pattern gr1 and a second grating pattern gr2. A width W1 of each of the patterns of the first grating pattern gr1 may be different from a width W2 of each of the patterns of the second grating pattern gr2. Furthermore, a period P1 of the first grating pattern gr1 and a period P2 of the second grating pattern gr2 may be different from each other. That is, the first grating pattern gr1 and the second grating pattern gr2 may be different from each other in period and pattern occupancy.

Figure 5:
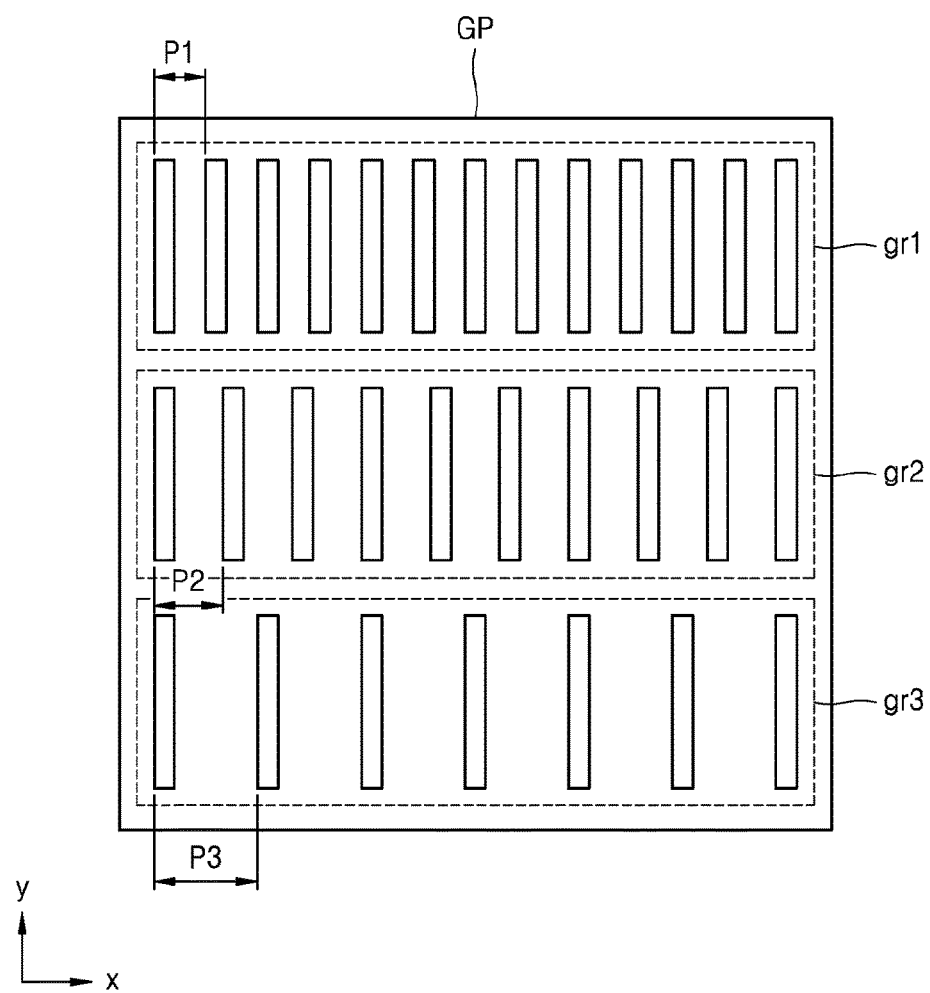
FIG. 5 is a diagram illustrating a surface of another example of a grating panel.

FIG. 5 is a diagram illustrating a surface of another example of the grating panel GP.

Referring to FIG. 5, the grating panel GP may include a first grating pattern gr1 having a first period P1, a second grating pattern gr2 having a second period P2, and a third grating pattern gr3 having a third period P3. The first to third grating patterns gr1, gr2, and gr3 may be provided in parallel to each other along an x-axis. The first to third grating patterns gr1, gr2, and gr3 may be also arranged to be spaced apart from one another in a y-axis direction. Thus, an interference pattern formed by light passing through the grating panel GP may vary according to a change in the y-axis direction.

As illustrated in FIG. 5, when the grating panel GP includes three grating patterns gr1, gr2, and gr3 having different periods, three different interference patterns may be formed by light passing through the grating panel GP. The optical measurement panel OP may measure a change in intensity of first light passing through the first grating pattern gr1 according to a propagation distance of the first light, a change in intensity of second light passing through the second grating pattern gr2 according to a propagation distance of the second light, and a change in intensity of third light passing through the third grating pattern gr3 according to a propagation distance of the third light. Furthermore, the processor 120 of FIG. 2 may calculate a wavelength spectrum of light incident on the grating panel GP from a change in the intensities of the first light to the third light according to the propagation distances of the first light to the third light.

FIG. 5 illustrates a case in which the three grating patterns gr1, gr2, and gr3 are included in the grating panel GP, but exemplary embodiments are not limited thereto. For example, the grating panel GP may include four or more grating patterns having different periods. Many different combinations of grating patterns and periods may be used, according to exemplary embodiments.

In addition, FIGS. 3 to 5 illustrate cases in which each of the grating patterns is formed one-dimensionally in a stripe shape, but exemplary embodiments are not limited thereto. For example, the first grating pattern gr1 and the second grating pattern gr2 of FIG. 3 may include grating patterns formed two-dimensionally.

Figure 6:
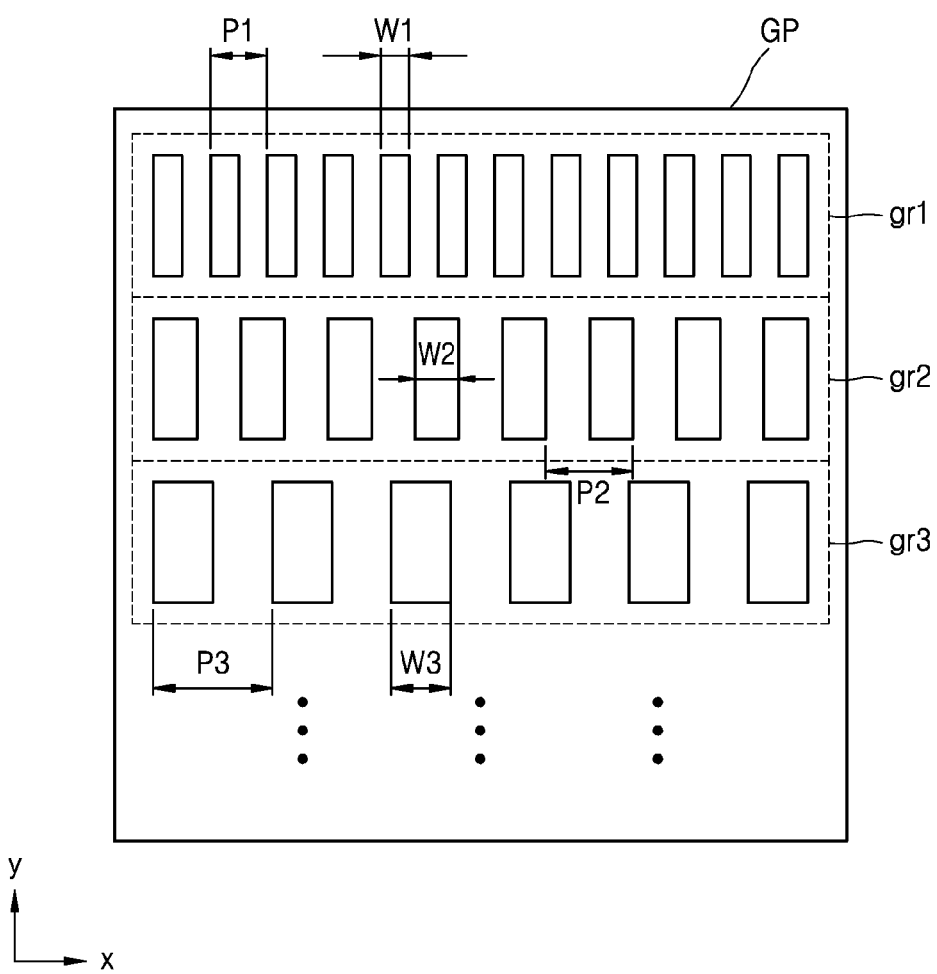
FIG. 6 is a diagram illustrating a surface of another example of a grating panel.

FIG. 6 is a diagram illustrating a surface of another example of the grating panel GP.

Referring to FIG. 6, the grating panel GP may include a first grating pattern gr1 having a first period P1, a second grating pattern gr2 having a second period P2, and a third grating pattern gr3 having a third period P3. The first to third grating patterns gr1, gr2, and gr3 may be arranged in parallel with one another along an x-axis. Furthermore, the first to third grating patterns gr1, gr2, and gr3 may be arranged to be spaced apart from one another in a y-axis direction. Pattern elements (e.g., unit slits) of the first grating pattern gr1 may each have a first width W1. Pattern elements (e.g., unit slits) of the second grating pattern gr2 may each have a second width W2. Pattern elements (e.g., unit slits) of the third grating pattern gr3 may each have a third width W3. At least two among the first width W1, the second width W2, and the third width W3 may be different from each other. For example, the second width W2 may be greater than the first width W1, and the third width W3 may be greater than the second width W2. As another example, the first width W1 may be half of the first period P1 or similar to the half. The second width W2 may be half of the second period P2 or similar to the half. The third width W3 may be half of the third period P3 or similar to the half. However, the periods and widths of the first to third grating patterns gr1, gr2, and gr3 are not limited to those examples described above and may be changed in various ways. Alternatively, at least another grating pattern (e.g., a fourth grating pattern) having a period different from those of the first to third grating patterns gr1, gr2, and gr3 may be further provided.

Figure 7:
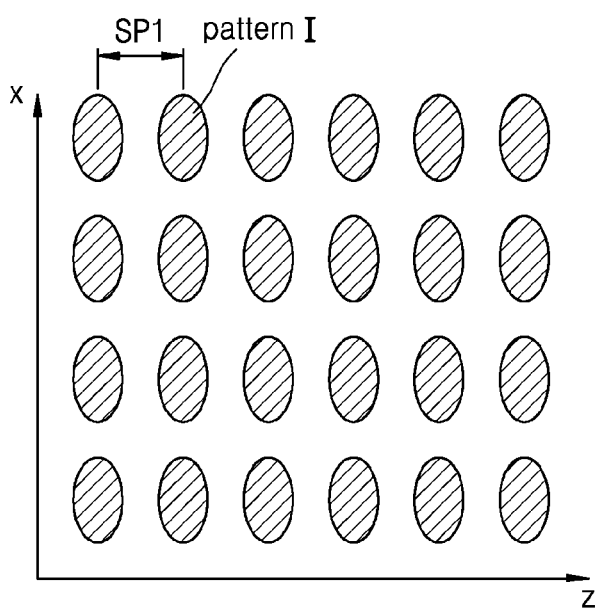
FIG. 7 is a diagram illustrating a view of an interference pattern of FIG. 1 along an z-x plane.

FIG. 7 is a diagram illustrating a view of the interference pattern of FIG. 1 along an z-x plane.

FIG. 7 illustrates an interference pattern formed by first light passing through the first grating pattern gr1. Referring to FIG. 7, an interference fringe pattern may repeatedly occur in a z-axis direction at distance intervals SP1. As shown in Equation 1 above, the distance intervals SP1 in the z-axis direction may depend on a period P1 of formation of the first grating pattern gr1 and a wavelength λ of incident light L1. It is understood that the periods P1 may have many different values.

Figure 8:
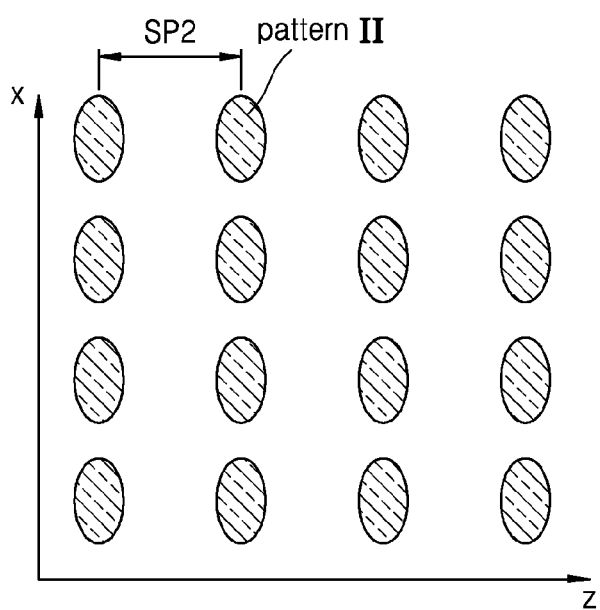
FIG. 8 is a diagram illustrating a view of another interference pattern of FIG. 1 along the z-x plane.

FIG. 8 is a diagram illustrating a view of another interference pattern of FIG. 1 along the z-x plane.

FIG. 8 illustrates an interference pattern formed by second light passing through the second grating pattern gr2. Referring to FIG. 8, an interference fringe pattern may repeatedly occur in a z-axis direction at distance intervals SP2. A period P2 of formation of the second grating pattern gr2 may be greater than the period P1 of formation of the first grating pattern gr1. Thus, the distance intervals SP2 at which the interference pattern formed by the second light passing through the second grating pattern gr2 repeatedly occurs may be greater than the distance intervals SP1 at which the interference pattern formed by the first light repeatedly occurs. It is understood that the periods P2 may have many different values.

Figure 9:
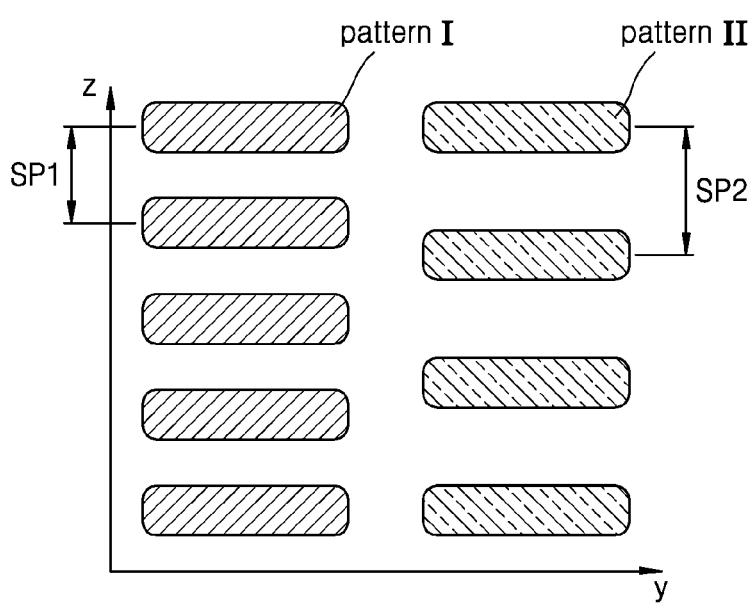
FIG. 9 is a diagram illustrating a view of an interference pattern of FIG. 1 along an y-z plane.

FIG. 9 is a diagram illustrating a view of an interference pattern of FIG. 1 along a y-z plane.

Referring to FIG. 9, distance intervals at which the interference pattern repeatedly occurs may vary according to a location of a y-axis. Distance intervals SP1 at which a pattern I formed by first light passing through the first grating pattern gr1 repeatedly occurs may be different from distance intervals SP2 at which a pattern II formed by second light passing through the second grating pattern gr2 repeatedly occurs. The distance intervals SP1 at which the pattern I formed by the first light repeatedly occurs may depend on a wavelength λ of incident light L1 and the period P1 of formation of the first grating pattern gr1. The distance intervals SP2 at which the pattern II formed by the second light repeatedly occurs may depend on the wavelength λ of the incident light L1 and the period P2 of formation of the second grating pattern gr2.

The optical measurement panel OP may measure a change in intensity of the first light according to a propagation distance of the first light and a change in intensity of the second light according to a propagation distance of the second light. The processor 120 may obtain, from a result of the measurement performed by the optical measurement panel OP, information regarding the distance intervals SP1 at which the pattern I formed by the first light repeatedly occurs in a z-axis direction and the distance intervals SP2 at which the pattern II formed by the second light repeatedly occurs in the z-axis direction. The processor 120 may calculate the wavelength λ of the incident light L1 from the information regarding the distance intervals SP1 at which the pattern I formed by the first light repeatedly occurs in the z-axis direction and the distance intervals SP2 at which the pattern II formed by the second light repeatedly occurs in the z-axis direction.

FIGS. 7 to 9 illustrate cases in which the incident light L1 is light having a single wavelength. When the incident light L1 is light having the single wavelength, patterns repeatedly occurring in different periods may be mixed in the interference pattern (the pattern I) formed by the first light and the interference pattern (the pattern II) formed by the second light. In this case, the processor 120 may calculate a wavelength spectrum of the first light by performing Fourier transform on the change in intensity of the first light according to the propagation distance of the first light. Furthermore, the processor 120 may calculate a wavelength spectrum of the second light by performing Fourier transform on the change in intensity of the second light according to the propagation distance of the second light.

Since the first grating pattern gr1 and the second grating pattern gr2 have different periods, the change in intensity of the first light according to the propagation distance of the first light and the change in intensity of the second light according to the propagation distance of the second light may be different from each other. That is, the interference pattern formed by the first light and the interference pattern formed by the second light may be different from each other. The processor 120 may calculate a wavelength spectrum of the first light and a wavelength spectrum of the second light by applying different arithmetic algorithms to the interference pattern formed by the first light and the interference pattern formed by the second light, in consideration of a period of formation of the first grating pattern gr1 and a period of formation of the second grating pattern gr2. The processor 120 may apply many different arithmetic algorithms which would be known to those skilled in the art.

Figure 10:
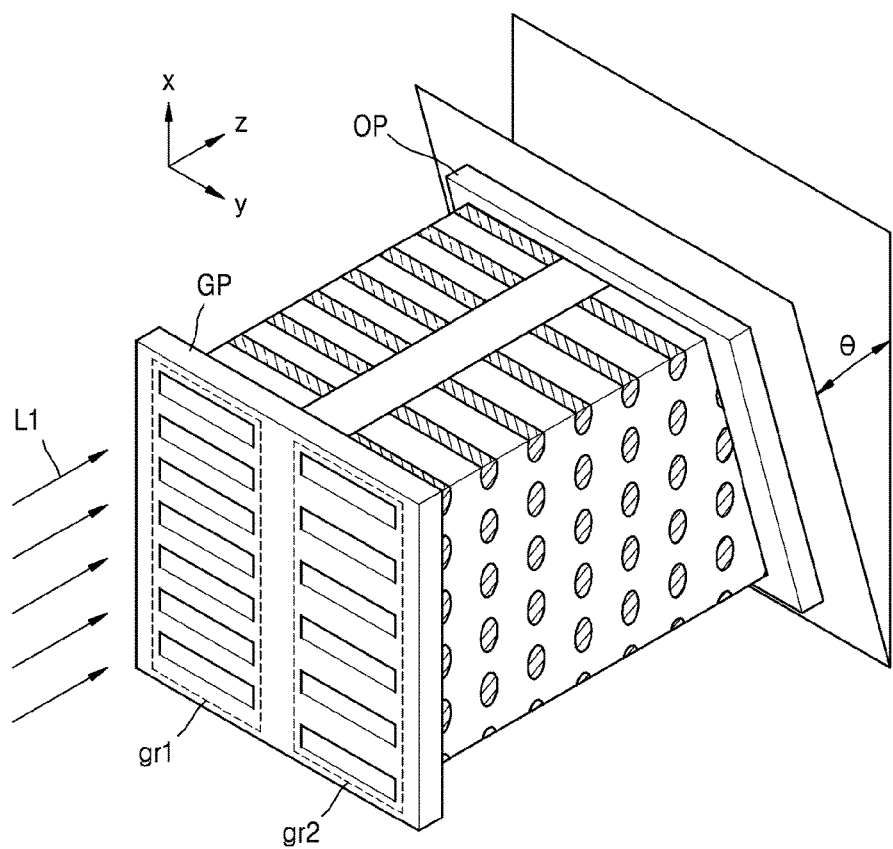
FIG. 10 is a diagram illustrating a perspective view of a spectral detector according to another exemplary embodiment.

FIG. 10 is a perspective view illustrating a spectral detector according to another exemplary embodiment. Features of the exemplary embodiment of FIG. 10 that are the same as those of the exemplary embodiments of FIGS. 1 to 9 will not be described again herein.

Referring to FIG. 10, an optical measurement panel OP may be arranged obliquely with respect to a grating panel GP. For example, the optical measurement panel OP may be tilted by an angle θ with respect to a plane parallel to the grating panel GP. In this case, the optical measurement panel OP may not be moved in a z-axis direction, unlike in the exemplary embodiments of FIGS. 1 and 2.

Figure 11:
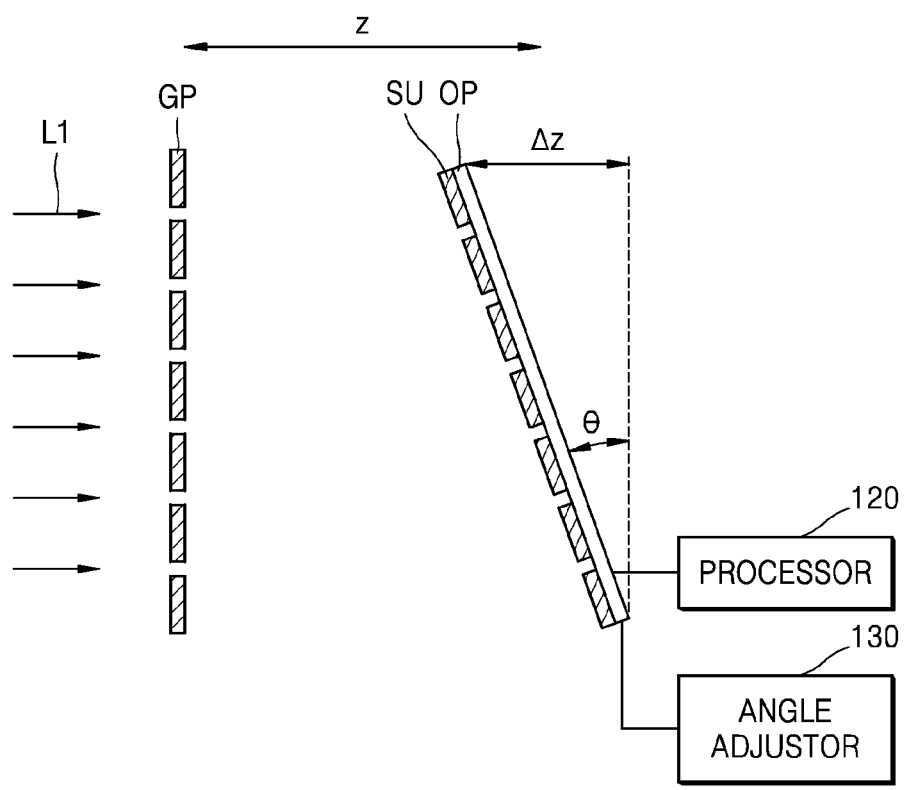
FIG. 11 is a diagram illustrating a view of the spectral detector of FIG. 10 along an z-x plane.

FIG. 11 is a diagram illustrating a view of the spectral detector of FIG. 10 along a z-x plane.

Referring to FIG. 11, the optical measurement panel OP may be tilted by an angle θ with respect to a x-axis. The angle θ may vary according to the size of the optical measurement panel OP, distance intervals at which an interference pattern formed by light passing through the grating panel GP repeatedly occurs, etc. The optical measurement panel OP may include a plurality of optical sensing units (e.g., light sensing unit or light sensor) SU which sense light and generate an electrical signal. Since the optical measurement panel OP is tilted with respect to the grating panel GP, the distances between the plurality of optical sensing units SU included in the optical measurement panel OP and the grating panel GP may vary according to the locations of the plurality of optical sensing units SU. For example, an optical sensing unit SU on a bottom end of the optical measurement panel OP may be more distant from the grating panel GP than another optical sensing unit SU on a top end of the optical measurement panel OP.

As illustrated in FIGS. 10 and 11, when the optical measurement panel OP is arranged to be tilted with respect to the grating panel GP, the plurality of optical sensing units SU of the optical measurement panel OP may sense light while being spaced apart by different distances from the grating panel GP. Thus, the optical measurement panel OP may measure a change in intensity of light passing through the grating panel GP according to a propagation distance of the light without moving the optical measurement panel OP in a z-axis direction as illustrated in FIGS. 1 and 2.

As described above, a period of formation of a first grating pattern gr1 and a period of formation of a second grating pattern gr2 are different from each other. Furthermore, the processor 120 may calculate a wavelength spectrum of first light and a wavelength spectrum of second light by applying different arithmetic algorithms with respect to a change in intensity of the first light according to a propagation distance of the first light and a change in intensity of the second light according to a propagation distance of the second light. In this case, the arithmetic algorithms may be determined according to the period of formation of the first grating pattern gr1 and the period of formation of the second grating pattern gr2.

Ideally, the wavelength spectrum of the first light and the wavelength spectrum of the second light calculated by the processor 120 should be the same when incident light L1 having the same wavelength spectrum is incident on the first grating pattern gr1 and the second grating pattern gr2 of the grating panel GP. However, the incident light L1 may not be incident on the grating panel GP completely perpendicularly to the grating panel GP or the incident light L1 may not be parallel. As an incidence angle of the incident light L1 on the grating panel GP changes, a condition of diffraction of the incident light L1 by the grating panel GP may be changed, and thus, an interference pattern formed when light passes through the grating panel GP may be changed.

However, when the processor 120 calculates the wavelength spectrum of the first light and the wavelength spectrum of the second light without taking into account a change in the incidence angle of the incident light L1, the wavelength spectrum of the first light and the wavelength spectrum of the second light may be calculated to be different to each other. Furthermore, any one of the wavelength spectrum of the first light and the wavelength spectrum of the second light may not be the same as that of the incident light L1.

Figure 12:
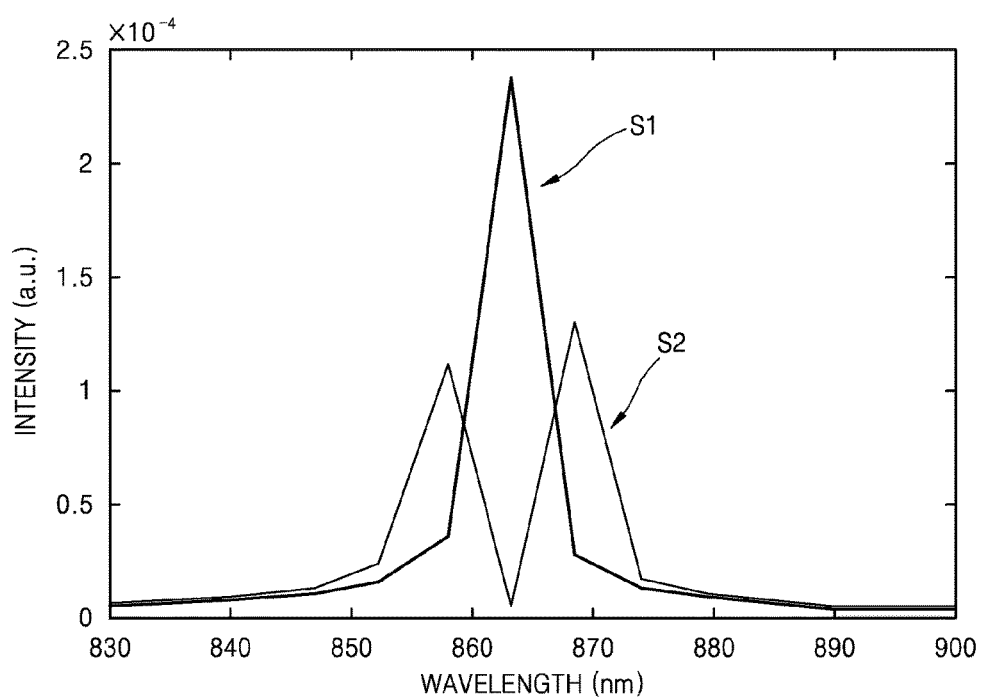
FIG. 12 is a graph illustrating a variation in a wavelength spectrum of first light calculated by a processor according to an incidence angle of incident light.
Figure 13:
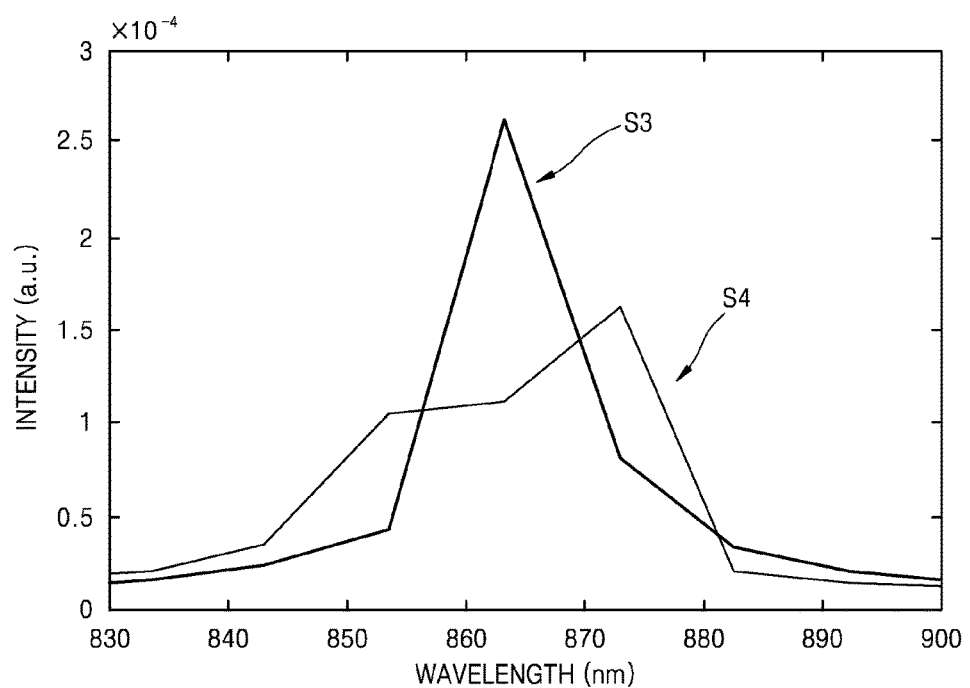
FIG. 13 is a graph illustrating a variation in a wavelength spectrum of second light calculated by a processor according to an incidence angle of incident light.

FIG. 12 is a graph illustrating a variation in a wavelength spectrum of first light calculated by the processor 120 according to an incidence angle of incident light L1. FIG. 13 is a graph illustrating a variation in a wavelength spectrum of second light calculated by the processor 120 according to the incidence angle of the incident light L1.

FIG. 12 illustrates a case in which the period P1 of the first grating pattern gr1 is about 1.035 µm. FIG. 13 illustrates a case in which the period P2 of the second grating pattern gr2 is about 1.2 µm. It is understood that these periods are exemplary only, and that the period P1 may be more or less than 1.035 µm and the period P2 may be more or less than 1.2 µm.

In FIG. 12, a plot S1 represents a first wavelength spectrum S1 calculated from an interference pattern of first light passing through the first grating pattern gr1 when the incidence angle of the incident light L1 was 0 degrees. A plot S2 represents a first wavelength spectrum S2 calculated from an interference pattern of the first light passing through the first grating pattern gr1 when the incidence angle of the incident light L1 was 0.2 degrees.

In FIG. 13, a plot S3 represents a second wavelength spectrum S3 calculated from an interference pattern of second light passing through the second grating pattern gr2 when the incidence angle of the incident light L1 was 0 degrees. A plot S4 represents a second wavelength spectrum S4 calculated from an interference pattern of the second light passing through the second grating pattern gr2 when the incidence angle of the incident light L1 was 0.2 degrees.

Referring to FIGS. 12 and 13, as the incidence angle of the incident light L1 exceeded 0 degrees, the calculated wavelength spectrums changed sensitively. For example, when the incidence angle is 0 degrees, the first wavelength spectrum S1 calculated from the interference pattern of the first light and the second wavelength spectrum S3 calculated from the interference pattern of the second light may be substantially the same. In both the wavelength spectrums S1 and S3, a peak may form at about 863 nm. In contrast, when the incidence angle of the incident light L1 is 0.2 degrees, the wavelength spectrum S2 of the first light and the wavelength spectrum S4 of the second light may be different from each other.

The processor 120 may compare the first wavelength spectrum calculated from the interference pattern of the first light with the second wavelength spectrum calculated from the interference pattern of the second light. When the difference between the first wavelength spectrum and the second wavelength spectrum is less than a reference value, the processor 120 may obtain a wavelength spectrum of light L1 incident on the grating panel GP from the first wavelength spectrum and the second wavelength spectrum. For example, the processor 120 may obtain the wavelength spectrum of the incident light L1 by calculating an average of the first wavelength spectrum and the second wavelength spectrum. As another example, the processor 120 may obtain the first wavelength spectrum or the second wavelength spectrum as the wavelength spectrum of the incident light L1. Additionally, the processor 120 may use other techniques to obtain the wavelength spectrum of the incident light L1, as would be appreciated by an artisan having ordinary skill in the art.

As shown in the plot S2 of FIG. 12 and the plot S4 of FIG. 13, when the difference between the first wavelength spectrum and the second wavelength spectrum is greater than or equal to the reference value, the processor 120 may determine that the incidence angle of the incident light L1 exceeds 0 degrees.

Referring back to FIG. 11, a spectral detector according to an exemplary embodiment may further include an angle adjustor 130 which adjusts the angle θ of the array of the optical measurement panel OP. The angle adjustor 130 may change the angle θ of the arrangement of the optical measurement panel OP when the processor 120 determines that the incidence angle of the incident light L1 exceeds 0 degrees. The angle adjustor 130 may correct an effect caused when the incidence angle of the incident light L1 exceeds 0 degrees by changing the angle θ of the optical measurement panel OP. The angle adjustor 130 may change the angle θ of the optical measurement panel OP, and receive, as feedback, information regarding a change in the first wavelength spectrum and the second wavelength spectrum from the processor 120. The angle adjustor 130 may change the angle θ of the optical measurement panel OP until the processor 120 determines that the difference between the first wavelength spectrum and the second wavelength spectrum is less than the reference value. It is understood that the reference value may be many different values.

As another example, the spectral detector may correct the effect caused when the incidence angle of the incident light L1 exceeds 0 degrees by adjusting (correcting) an arithmetic algorithm to be used to calculate a wavelength spectrum by the processor 120 without changing the angle θ of the optical measurement panel OP. For example, when the difference between the first wavelength spectrum and the second wavelength spectrum is greater than or equal to the reference value, the processor 120 may determine that the incidence angle of the incident light L1 exceeds 0 degrees. Furthermore, the processor 120 may adjust (correct) a process of calculating the first wavelength spectrum and a process of calculating the second wavelength spectrum by taking into account the incidence angle of the incident light L1. The processor 120 may adjust (correct) the process of calculating the first wavelength spectrum and the process of calculating the second wavelength spectrum such that the difference between the first wavelength spectrum and the second wavelength spectrum is less than the reference value. Furthermore, the processor 120 may obtain a wavelength spectrum of the incident light L1 from the first and second wavelength spectrums obtained through the corrected processes.

More specifically, referring to FIG. 12, when light having a wavelength of 863 nm is incident at an angle of 0 degrees, a peak of the first wavelength spectrum S1 may be about 863 nm. Referring to FIG. 13, when light having a wavelength of 863 nm is incident at an angle of 0 degrees, a peak of the second wavelength spectrum S3 may be about 863 nm. In this case, locations of the peaks of the first and second wavelength spectrums S1 and S3 may be substantially the same, and a difference therebetween may be, for example, about ±2 nm or less or about ±1 nm or less. In this case, it may be determined that the difference between the two wavelength spectrums S1 and S3 is less than the reference value. Referring to FIG. 12, when light having a wavelength of 863 nm is incident at an angle of 0.2 degrees, peaks of the first wavelength spectrum S2 may be about 858 nm and about 869 nm. Referring to FIG. 13, when light having a wavelength of 863 nm is incident at an angle of 0.2 degrees, a peak of the second wavelength spectrum S4 may be far beyond a range of the peaks of the first wavelength spectrum S2 (about 858 nm and about 869 nm). The difference between the locations of the peaks of the first wavelength spectrum S2 and a location of the peak of the second wavelength spectrum S4 corresponding thereto may be about 1 nm or more or about 2 nm or more. In this case, it may be determined that the difference between the two wavelength spectrums S2 and S4 is greater than or equal to the reference value, and thus correction may be performed as described above. For example, correction may be performed until the peak of the first wavelength spectrum S1 of FIG. 12 occurs and until the peak of the second wavelength spectrum S3 of FIG. 13 occurs. Alternatively, correction may be performed until some other criteria is satisfied.

If one grating pattern having one period is used, it may be difficult to determine whether a spectrum corresponding to the first wavelength spectrum S2 of FIG. 12 is generated as light having a wavelength of 863 nm is incident at an angle of 0.2 degrees or as light having a wavelength of 858 nm and light having a wavelength of 869 nm are incident at an angle of 0 degrees. However, when a plurality of grating patterns having different periods are used, as described in the above exemplary embodiments, the plurality of grating patterns exhibit different results with respect to light incident obliquely (see, for example, S2 of FIG. 12 and S4 of FIG. 13) and correction may be easily performed based on the different results. Accordingly, precision and resolution may be improved through the correction. However, the above descriptions referring to FIGS. 12 and 13 are merely examples, and correction may be performed on elements in a more complicated manner.

As described above, when the grating panel GP includes the plurality of grating patterns gr1 and gr2 having different periods, the processor 120 may compare wavelength spectrums output from the respective grating patterns gr1 and gr2 with each other. For example, when the grating panel GP includes the first grating pattern gr1 having a first period and the second grating pattern gr2 having a second period, the processor 120 may determine whether the incidence angle of the incident light L1 exceeds an estimated incidence angle (e.g., 0 degrees) by comparing a first wavelength spectrum of first light passing through the first grating pattern gr1 and a second wavelength spectrum of second light passing through the second grating pattern gr2 with each other.

When the processor 120 determines that the incidence angle of the incident light L1 exceeds the estimated incidence angle, the angle adjustor 130 may adjust the angle θ of the arrangement of the optical measurement panel OP to correct an effect caused by the incidence angle of the incident light L1. As another example, the processor 120 may correct a process of calculating the first wavelength spectrum and a process of calculating the second wavelength spectrum.

According to the above exemplary embodiments, a spectral detector using the Talbot effect is provided. Thus, the spectral detector may be manufactured in a small size. Furthermore, since the grating panel GP of the spectral detector includes a plurality of grating patterns having different periods, an error caused by a change in an incidence angle of light on the grating panel GP may be corrected. Accordingly, reliability and precision of the spectral detector may be increased.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A spectral detector comprising:
   a grating panel comprising:
   a light incident surface on which light is incident, the light incident surface being a single surface;
   a first grating pattern provided on a first portion of the light incident surface, the first grating pattern having a first period;
   a second grating pattern provided on a second portion of the light incident surface, the second rating pattern having a second period that is different from the first period and the second portion being different from the first portion; and
   a light exit surface through which light exits the grating panel; and
   an optical measurement panel arranged to face the light exit surface of the grating panel, and configured to measure a change in intensity of first light passing through the first grating pattern according to a propagation distance of the first light, and to measure a change in intensity of second light passing through the second grating pattern according to a propagation distance of the second light.

2. The spectral detector of claim 1, wherein the first grating pattern and the second grating pattern are parallel to each other.

3. The spectral detector of claim 1, wherein a surface of the optical measurement panel which receives the light that exits the light exit surface is arranged obliquely with respect to the light exit surface of the grating panel.

4. The spectral detector of claim 1, further comprising a distance adjustor configured to change a distance between the optical measurement panel and the grating panel to thereby change the propagation distance of the first light and the propagation distance of the second light.

5. The spectral detector of claim 1, further comprising a processor configured to obtain at least one wavelength spectrum of light incident on the grating panel based on the change in intensity of the first light according to the propagation distance of the first light and the change in intensity of the second light according to the propagation distance of the second light.

6. The spectral detector of claim 5, wherein the processor is further configured to obtain a first wavelength spectrum based on the change in intensity of the first light according to the propagation distance of the first light, and a second wavelength spectrum based on the change in intensity of the second light according to the propagation distance of the second light.

7. The spectral detector of claim 6, wherein the processor is further configured to determine whether a difference between the first wavelength spectrum and the second wavelength spectrum is greater than or equal to a reference value.

8. The spectral detector of claim 7, further comprising an angle adjustor configured to, when the difference between the first wavelength spectrum and the second wavelength spectrum is greater than or equal to the reference value, adjust an angle of a surface of the optical measurement panel which receives the light after the light exits the light exit surface.

9. The spectral detector of claim 7, wherein the processor is further configured to calculate the first wavelength spectrum and the second wavelength spectrum based on an algorithm, and to adjust the algorithm when the difference between the first wavelength spectrum and the second wavelength spectrum is greater than or equal to the reference value.

10. The spectral detector of claim 5, wherein the processor is further configured to obtain a wavelength spectrum of light incident on the grating panel by performing a Fourier transform on each of the change in intensity of the first light according to the propagation distance of the first light and the change in intensity of the second light according to the propagation distance of the second light.

11. The spectral detector of claim 1, wherein the grating panel further comprises at least one additional grating pattern having a period that is different from periods of the first and second grating patterns.

12. A spectral detecting method comprising:
emitting light to be incident on a light incident surface of a grating panel comprising a first grating pattern provided on a first portion the light incident surface and having a first period, a second grating pattern provided on a second portion of the light incident surface and having a second period different from the first period, and a light exit surface through which light exits the grating panel, the light incident surface being a single surface and the second portion being different from the first portion; and
measuring a change in intensity of first light passing through the first grating pattern according to a propagation distance of the first light and a change in intensity of second light passing through the second grating pattern according to a propagation distance of the second light by using an optical measurement panel facing the light exit surface of the grating panel.

13. The spectral detecting method of claim 12, wherein the first grating pattern and the second grating pattern are parallel to each other.

14. The spectral detecting method of claim 12, further comprising arranging a surface of the optical measurement panel, which receives the light that exits the light exit surface, obliquely with respect to the light exit surface of the grating panel.

15. The spectral detecting method of claim 12, further comprising changing a distance between the optical measurement panel and the grating panel to thereby change the propagation distance of the first light and the propagation distance of the second light.

16. The spectral detecting method of claim 12, further comprising obtaining at least one wavelength spectrum of light incident on the grating panel based on the change in intensity of the first light according to the propagation distance of the first light and the change in intensity of the second light according to the propagation distance of the second light.

17. The spectral detecting method of claim 16, wherein the obtaining the at least one wavelength spectrum of the light incident on the grating panel comprises:
obtaining a first wavelength spectrum based on the change in intensity of the first light according to the propagation distance of the first light; and
obtaining a second wavelength spectrum based on the change in intensity of the second light according to the propagation distance of the second light.

18. The spectral detecting method of claim 17, further comprising determining whether a difference between the first wavelength spectrum and the second wavelength spectrum is greater than or equal to a reference value.

19. The spectral detecting method of claim 18, further comprising changing an angle of a surface of the optical measurement panel when the difference between the first wavelength spectrum and the second wavelength spectrum is greater than or equal to the reference value.

20. The spectral detecting method of claim 18, further comprising adjusting an algorithm used to calculate the first wavelength spectrum and the second wavelength spectrum when the difference between the first wavelength spectrum and the second wavelength spectrum is greater than or equal to the reference value.

21. The spectral detecting method of claim 16, wherein the obtaining of the at least one wavelength spectrum of the light incident on the grating panel comprises performing a Fourier transform on each of the change in intensity of the first light according to the propagation distance of the first light and the change in intensity of the second light according to the propagation distance of the second light.

* * * * *